United States Patent [19]

Neumann

[11] Patent Number: 4,780,635
[45] Date of Patent: Oct. 25, 1988

[54] DYNAMO-ELECTRIC MACHINE LAMINATION CONSTRUCTION

[75] Inventor: Thomas W. Neumann, Fort Wayne, Ind.

[73] Assignee: General Electric Company, Fort Wayne, Ind.

[21] Appl. No.: 20,297

[22] Filed: Feb. 27, 1987

[51] Int. Cl.$^4$ ............................................... H02K 1/00
[52] U.S. Cl. ...................................... 310/216; 310/42; 310/179; 310/254; 310/261
[58] Field of Search ............... 310/216, 217, 211, 254, 310/258, 259, 42, 261, 264, 265, 267, 179, 185, 180, 184, 198, 214; 29/596, 598

[56] References Cited

U.S. PATENT DOCUMENTS

| 3,081,412 | 3/1963 | Granier | 310/258 |
| 3,159,762 | 12/1964 | Haifley | 310/259 |
| 3,229,134 | 1/1966 | Rakula | 310/216 |
| 3,762,041 | 10/1973 | Bair | 29/596 |
| 4,209,720 | 6/1980 | Ducrot et al. | 310/45 |
| 4,566,179 | 1/1986 | Sawyer et al. | 29/596 |

FOREIGN PATENT DOCUMENTS

| 0068531 | 3/1956 | Fed. Rep. of Germany | 310/216 |
| 0060905 | 5/1977 | Japan | 310/216 |
| 0041168 | 3/1980 | Japan | 310/216 |

OTHER PUBLICATIONS

ANSI/NEMA Standards Publication No. MG1-1987; 5 pages; Washington, D.C.

Primary Examiner—R. Skudy
Attorney, Agent, or Firm—Ralph E. Krisher, Jr.

[57] ABSTRACT

A lamination for use in a dynamo-electric machine of the kind employing a stacked laminated stator and/or rotor, is formed of a flat annular plate of ferromagnetic material having a given outer diameter and a bore opening of a certain inner diameter. The plate has a number of equally circumferentially spaced slot opening extending from an intermediate circumference to form a number of teeth which extend radially to an air gap periphery of the plate. The slot openings are formed to contain electrical conducting elements which extend axially of the lamination stack to correspond to an n pole operating configuration. The annular plate includes a tooth portion defined by the teeth between the intermediate circumference and the air gap periphery, and a yoke portion defined by a continuous surface of the plate between the intermediate circumference and the periphery of the plate radially opposite the air gap periphery. For a given ratio of inner diameter to outer diameter for the plate, the teeth are sufficiently wide relative to the area of the slot openings to that the ratio of flux density in the tooth portion to flux density in the yoke portion in response to current passed through the conducting elements, is optimized for a given n pole operating configuration of the conducting elements.

34 Claims, 7 Drawing Sheets

| ANSI NEMA FRAME | POLES | LAMINATION O.D. (TYP) MM. STATOR | ROTOR | ID/OD SPECIFIC | ID/OD RANGE | T1/TS SPECIFIC | T1/TS RANGE | FLUX DENSITY TOOTH YOKE PORTIONS $BT_1/BY_1$ SPECIFIC | RANGE | $S2 \times T2 / S1 \times T1$ * SPECIFIC | RANGE |
|---|---|---|---|---|---|---|---|---|---|---|---|
| 180 | 2 | 203 | 95 | 0.468 | .45-.50 | 0.563 | .54-.59 | 1.234 | 1.17-1.25 | 0.85 | .83-.88 |
| 210 | 2 | 242 | 115 | 0.475 | .45-.50 | 0.548 | .52-.57 | 1.2 | 1.17-1.25 | 0.848 | .83-.88 |
| 180 | 4 | 203 | 122 | 0.601 | .58-.61 | 0.648 | .62-.68 | 1.204 | 1.17-1.25 | 0.919 | .86-.96 |
| 210 | 4 | 242 | 150 | 0.62 | .60-.62 | 0.611 | .60-.65 | 1.15 | 1.12-1.17 | 0.9 | .86-.96 |
| 180 | 4 | 203 | 122 | 0.601 | .58-.61 | 0.573 | .55-.60 | 1.173 | 1.14-1.20 | 0.9 | .86-.96 |
| 210 | 4 | 242 | 150 | 0.62 | .60-.62 | 0.516 | .50-.55 | 1.05 | 1.02-1.08 | 0.88 | .86-.96 |
| 180 | 6 | 203 / 203 | 122 | 0.601 | .58-.61 | 0.648 / 0.573 | .62-.68 / .55-.60 | 1.806 / 1.76 | 1.76-1.84 / 1.72-1.80 | 0.84 / 0.95 | .80-.90 / .92-.98 |

\* S2 (NUMBER OF ROTOR SLOTS)
S1 (NUMBER OF STATOR SLOTS)
T1 (STATOR TOOTH WIDTH)
T2 (ROTOR TOOTH WIDTH)

FIG. 7

LAMINATION CROSS SECTIONS
180 FRAME

|  | 2 POLE | | 4 POLE | | | 6 POLE | |
|---|---|---|---|---|---|---|---|
|  | PRIOR ART | PRESENT INVENTION | PRESENT INVENTION EMBODIMENT 1 | PRESENT INVENTION EMBODIMENT 2 | PRIOR ART | PRIOR ART 1 | PRESENT INVENTION |
| OD (in) | 7.478 | 7.992 | 7.992 | 7.992 | 7.478 | 7.478 | 7.992 |
| ID/OD | .535 | .468 | .601 | .601 | .619 | .619 | .601 |
| $T_1/T_S$ | .450 | .563 | .648 | .573 | .57 | .57 | .573 |
| $BT_1/BY_1$ | 1.144 | 1.234 | 1.204 | 1.173 | 1.078 | 1.616 | 1.76 |
| $S_2T_2/S_1T_1$ | .808 | .850 | .919 | .900 | .813 | .813 | .950 |
| $W_{10}$ (in) | .100 | .102 | .102 | .102 | .100 | .100 | .102 |
| $S_1$ (NUMBER OF STATOR SLOTS) | 36 | 24 | 36 | 36 | 36 | 36 | 36 |
| $(S_1)\times(A SLOT-GROSS)$ (in²) | — | — | 4.50 | 6.494 | 5.61 | 5.61 | 6.49 |
| $(S_1)\times(A SLOT-NET)$ (in²) | 4.77 | 5.02 | 3.672 | 5.512 | 4.69 | 4.684 | 5.512 |
| $S_2$ (NUMBER OF ROTOR SLOTS) | 28 | 28 | 28 | 28 | 44 | 44 | 44 |

FIG. 8

LAMINATION CROSS SECTIONS
210 FRAME

| | 2 POLE | | 4 POLE | | |
|---|---|---|---|---|---|
| | PRIOR ART | PRESENT INVENTION | PRESENT INVENTION EMBODIMENT 1 | PRESENT INVENTION EMBODIMENT 2 | PRIOR ART |
| OD (in) | 8.775 | 9.527 | 9.528 | 9.528 | 8.775 |
| ID/OD | .556 | .475 | .620 | .620 | .626 |
| $T_1/T_S$ | .404 | .548 | .611 | .516 | .506 |
| $BT_1/BY_1$ | 1.142 | 1.200 | 1.15 | 1.05 | 1.086 |
| $S_2T_2/S_1T_1$ | .902 | .848 | .90 | .88 | .875 |
| $W_{10}$ (in) | .125 | .126 | .126 | .126 | .125 |
| $S_1$ (NUMBER OF STATOR SLOTS) | 36 | 24 | 36 | 36 | 36 |
| $(S_1)\times$(ASLOT-GROSS) (in²) | 8.69 | 8.78 | 6.89 | 11.36 | 9.04 |
| $(S_1)\times$(ASLOT-NET) (in²) | 6.56 | 7.86 | 5.85 | 10.04 | 7.36 |
| $S_2$ (NUMBER OF ROTOR SLOTS) | 26 | 28 | 28 | 28 | 44 |

FIG. 9

DYNAMO-ELECTRIC MACHINE LAMINATION CONSTRUCTION

BACKGROUND OF THE INVENTION

1. Field of the Invention

The present invention relates generally to core laminations or punchings for use in dynamo-electric machines, and more particularly, to a lamination construction in which teeth and yoke portions of the laminations have relative dimensions such as to provide improved output for a given size machine.

2. Description of the Known Art

Arrangements are known for improving the efficiency or power output of dynamo-electric machines through the provision of certain slot distributions in either a stator or rotor core element of the machine, e.g. U.S. Pat. No. 4,566,179 (Jan. 28, 1986) or by creating a prescribed variation of magnetic flux through a pole of the machine stator relative to the ampere-turns of the pole such as in U.S. Pat. No. 4,209,720 (June 24, 1980). However, there has not been disclosed a machine lamination construction by which the operating efficiency of a dynamo-electric machine having a stacked laminated stator and/or rotor is improved by a prescribed ratio of inner diameter to outer diameter for the lamination. Also, there has been no disclosure of a lamination construction by which the ratio of flux density in a tooth portion of the lamination to flux density in a yoke portion of the lamination can be increased over that obtained conventionally, and, as a result, yield greater output or operating efficiency for the machine.

SUMMARY OF THE INVENTION

An object of the invention is to provide a dynamo-electric machine lamination construction in which improvement is obtained through a greater amount of lamination material and less winding conductors than used previously.

Another object of the invention is to provide a dynamo-electric machine in which leakage flux from end turns of a winding embedded in slots of a laminated core, is substantially reduced.

A further object of the invention is to provide a dynamo-electric machine having a greater horsepower to volume ratio than that previously obtained.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

BRIEF DESCRIPTION OF THE DRAWING

In the drawing:

FIG. 7 is a table showing preferred ranges and specific values of physical relationships and ratios associated with the laminations of FIGS. 3 and 5 when dimensioned for different frame sizes and designed for different numbers of poles;

FIG. 8 is a table showing comparative data for physical relationships and ratios associated with the laminations of FIGS. 3 and 5 (when of a NEMA 180 Frame size and designed for 2 (two), 4 (four), and 6 (six) pole operation) in relation to those of known laminations for a certain machine frame size:

FIG. 9 is a table showing comparative data on physical relationships and ratios associated with the laminations of FIGS. 3 and 5 (when of a NEMA 210 Frame size and designed for 2 (two) or 4 (four) pole operation) in relation to those of the known laminations for another machine frame size.

DETAILED DESCRIPTION OF THE INVENTION

Figure 1:
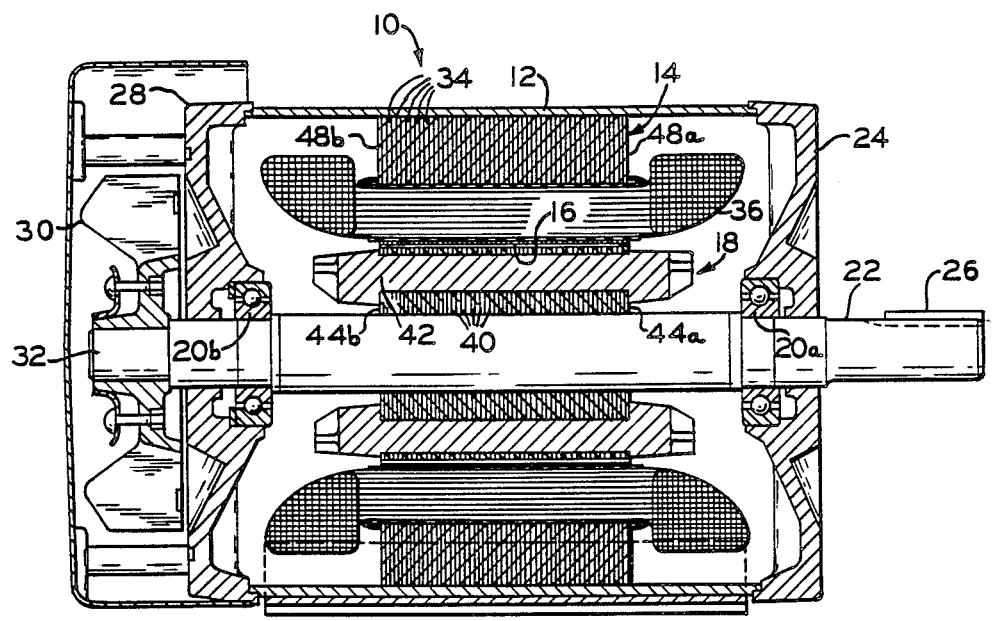
FIG. 1 is a side view, partly in section, of a dynamo-electric machine in which the present invention may be embodied.
Figure 2:
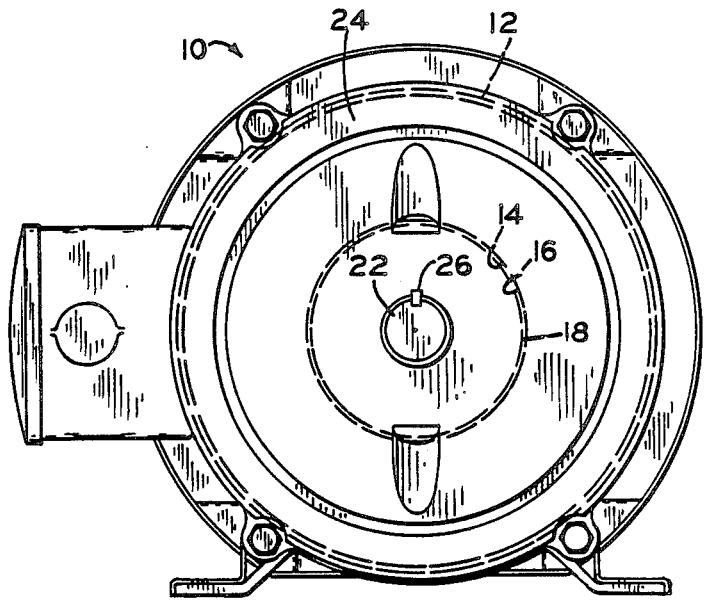
FIG. 2 is a front view of the machine in FIG. 2.

FIG. 1 shows a side view, in section, of a dynamo-electric machine 10 in which the present invention may be embodied. A front view of the machine 10 is shown in FIG. 2.

Basically, the machine 10 includes a generally cylindrical outer casing 12, and a generally cylindrical stator 14 fixed coaxially within the outer casing 12 and havng a coaxial stator bore 16. A rotor 18 is supported by suitable bearings 20a, 20b at the front and back of casing 12, to extend axially within the stator bore 16 and for rotational movement about the bore axis. In the particular example shown a shaft part 22 of the rotor 18 extends axially from a front end shield 24 of the machine 10, and has a key 26 projecting radially outward from a recess cut axially a certain distance from the front of the shaft part 22. Key 26 serves to lock the shaft part 22 into a corresponding key way cut in a load member (not shown), e.g., a fan, to which rotational motive power is to be supplied by the machine 10.

A back end shield 28 (FIG. 1) together with the casing 12 and the front end shield 24 serve to contain and protect the stator 14, rotor 18 and associated conductive windings. In the example shown, a machine cooling fan 30 is mounted on a rotor stub part 32 which extends outside the back end shield 28, and directs an air current flow over the casing.

As shown in FIG. 1, the stator 14 is comprised of a stack of plate laminations 34 of ferromagnetic material. The laminations 34 are stacked face-to-face and are held together to form a core by any of the various means well known in the art. A number of slots extend along the axial length of the stator 14, and extend radially from the stator bore 16. These slots accommodate stator windings that have end turns 36, parts of which are shown in FIG. 1. Details of individual plate laminations embodying the invention in preferred forms are given below.

As shown in FIG. 1, the shaft part 22 of the rotor 18 extends axially from the machine casing or housing 12 and has a stack of rotor laminations 40 fixed coaxially on the shaft part 22 intermediate the front and back bearings 20a, 20b. Sets of conductive bars 42 pass through a number of axially extending slots formed in the rotor 18 near the outer periphery of each of the laminations 40. The bars 42 are shorted to one another at the axial ends 44a, 44b of the rotor laminations 40 by a set of end rings.

In FIG. 1, the stator winding end turns 36 at axial end faces 48a, 48b, of the stator 14, are a source of stator flux leakage i.e. magnetic flux produced by the stator winding which does not interface with the conductive bars 42 in the rotor laminations 40. Inasmuch as stator flux leakage does not contribute to the resultant torque exerted on the rotor 18 when the stator winding or windings are energized, such flux leakage adversely effects the operating efficiency of the machine 10. It will therefore be understood that any means by which potential sources of stator flux leakage can be reduced or eliminated, are of great importance in dynamo-electric machine construction.

Certain machine construction standards are known in the industry, particularly those set out by ANSI/NEMA Standards Publication No. MG1-1978(R1981).

The present invention aims to provide a dynamo-electric machine construction which conforms with industry standards, particularly with respect to the so-called 180 and 210 frame size constuctions. It will be understood, however, that although dimensions for machine laminations disclosed herein will apply to the 180 and 210 frame sizes, the invention can be embodied with advantage in machines of various sizes and proportions.

Figure 3:
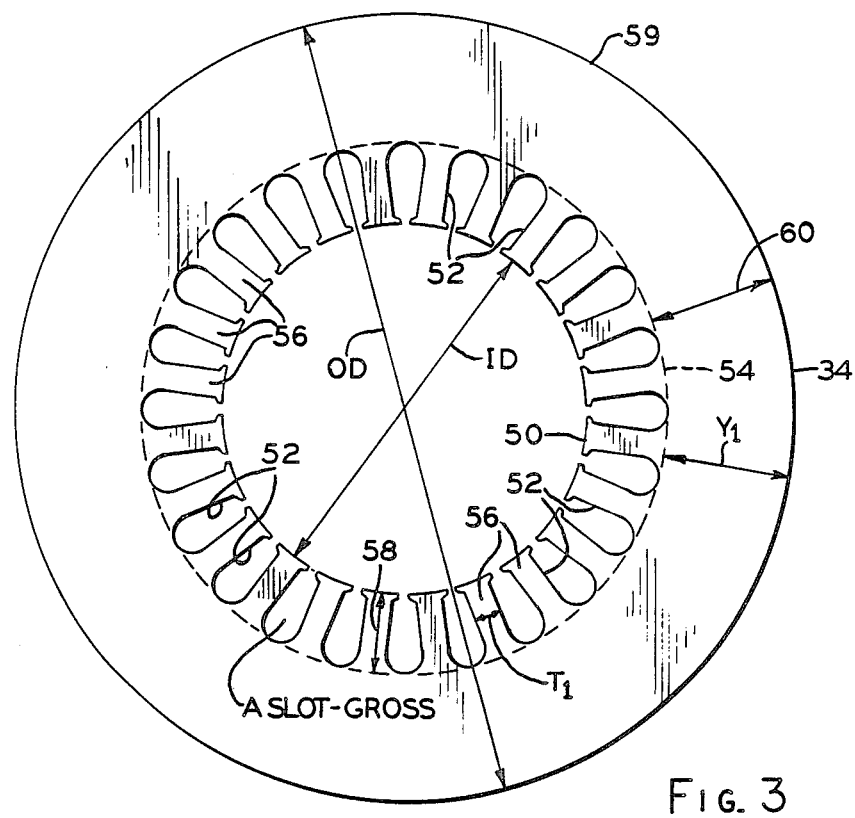
FIG. 3 is a plan view of a plate lamination for forming a stator in the machine of FIGS. 1 and 2.

In FIG. 3, a stator lamination 34 according to the invention comprises a flat annular plate of ferromagnetic material having an outer diameter "OD" according to the tabular values of FIGS. 8 or 9 and a generally circular bore opening 50 of a certain inner diameter "ID". The lamination 34 has a number of equally circumferentially spaced slot openings 52 extending radially from an intermediate circumference 54 to form a number of teeth 56 which extend radially to the circumference of the bore opening 50. The bore has a diameter of "ID". In the illustrated embodiment in FIG. 3, the lamination 34 is a stator lamination so that the circumference of the bore opening 50 defines one boundary for a stator-rotor air gap and a bore for receiving the rotor.

The slot openings 52 are formed to contain one or more stator windings which extend axially through the stator 14 when like ones of the plates 34 are stacked face-to-face with corresponding slot openings 52 substantially aligned with one another. In the assembled machine 10 of FIGS. 1 and 2, the stator windings are arranged to correspond to an n (e.g., 2, 4, 6, etc.) pole operating configuration for the machine 10. When the stator windings are connected to an outside electrical source, magnetic flux is produced next to the substantially aligned air gap peripheries of the stacked laminations 34 to interact with the conductive bars 42 of the rotor 18.

The annular lamination 34 in FIG. 3 includes a tooth portion 58 defined by the teeth 56 between the intermediate circumference 54 and the air gap periphery. The remainder of the lamination 34 is continuous between the intermediate circumference 54 and the outer periphery 59 to define a yoke portion 60 of the lamination 34.

Figure 4:
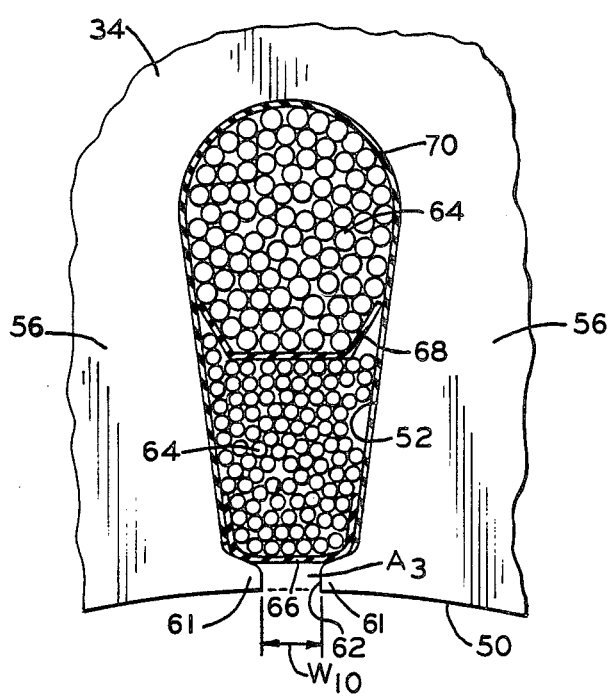
FIG. 4 is an enlarged view of a part of the lamination in FIG. 3.

FIG. 4 is an enlarged view of a part of the plate laminations 34 in FIG. 3. Specifically, a single slot opening 52 is shown surrounded by adjacent teeth 56. Lip parts 61 project circumferentially toward one another from the adjacent teeth 56, to define a mouth 62 (of width $W_{10}$) of the slot opening 52. As is known, moutn 62 should be sufficiently wide to allow individual conductors 64 forming the stator winding to be inserted in the opening 52 through the mouth 62 when the machine 10 is assembled. The lip parts 61 act to seat a winding closure wedge 66 which holds the conductors 64 of the stator winding firmly in place within the stator slots formed by the openings 52. To separate individual stator windings, an insulating winding separator 68 may be positioned as shown in FIG. 4 in the stator slots, and an insulating film 70 positioned against the walls of the stator slots prevents arching or short circuiting of individual conductors 64 with the material or which the laminations 34 are made.

Figure 5:
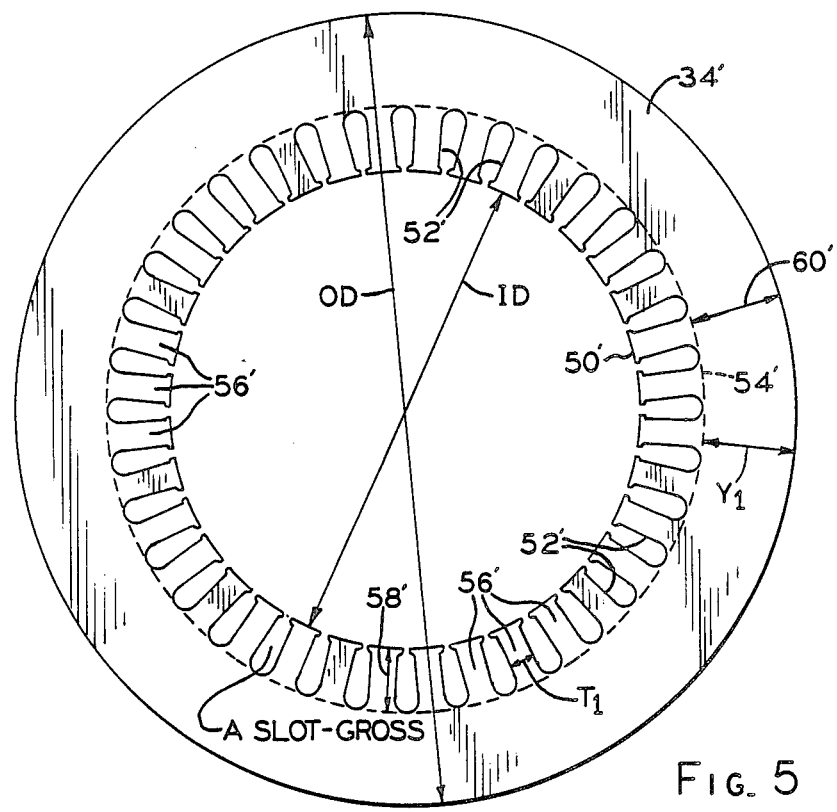
FIG. 5 is a plan view of another plate lamination for forming a stator in the machine of FIGS. 1 and 2.
Figure 6:
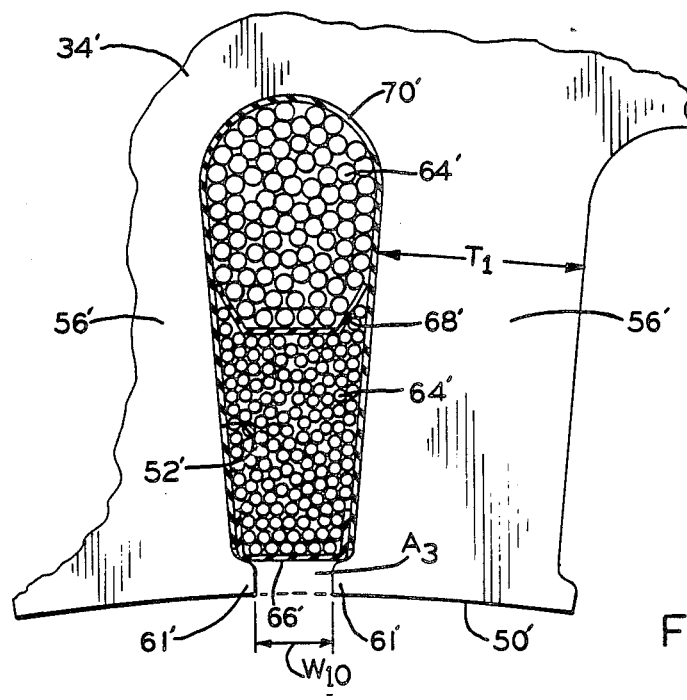
FIG. 6 is an enlarged view of a part of the lamination in FIG. 5.

According to the invention, for a given ratio of inner diameter ID to outer diameter OD of the lamination 34, the teeth 56 are sufficiently wide relative to the area of the slot openings 52 so that the ratio of flux density in the tooth portion 58 ($BT_1$) to flux density in the yoke portion 60 ($BY_1$) when the stator windings are energized, as well as electric current is substantially optimized for a given n pole operation of the stator windings. The actual number of slot openings is not critical. For example, the lamination 34 in FIG. 3 is shown with 24 slots and has relative dimensions suitable for incorporation in a 180 frame size machine. A lamination 34' according to the invention as shown in FIG. 5, has 36 slots and relative dimensions suitable for use in a 210 frame size machine. Parts of the lamination 34' which correspond to those of the lamination 34 in FIGS. 3 and 4, are identified with similar reference numerals.

An underlying concept of the present invention is to utilize maximum amounts of ferromagnetic material (e.g., iron) for the laminations 34 (or 34') and minimum amounts of winding conductors, e.g., the individual conductors 64 or 64' in a dynamo-electric machine having a desired power handling capability.

In the disclosed embodiments, the ratios of the tooth portions 58 to yoke portions 60 for the laminations 34 substantially differ from known constructions, as does the ratio of inner diameter to outer diameter of the laminations 34. The lip parts 61 thus become very small relative to the known structures as a consequence of the relatively wide teeth 56. Use of less winding material also results in smaller end turns (e.g., the stator end turns 36) at the end faces of the lamination stack, and, thus, undesired flux leakage is significantly reduced from that in the prior constructions.

FIG. 7 is a table which shows preferred ranges and specific values for physical constants, relationships, and ratios associated with both stator and rotor laminations having a number of slots $S_1$ and $S_2$ according to the invention. Assuming, e.g., that a machine conforming to a standard frame size is to be constructed, the NEMA Standards will limit the maximum outside dimensions of the motor in which the stator lamination size is optimized. Typical outer diameters (O.D.) for both stator and rotor laminations for use in the 180 and 210 frame size standard, are represented in FIG. 7. FIG. 7 also provides specific values as well as ranges for various ratios which are used to define the improved stator lamination. The ratio ID/OD represents the ratio of the inner diameter of the stator lamination to the outer diameter and gives an indication of the larger amount of ferromagnetic material than copper which is used in the present laminations. The ratio T1/Ts represents a ratio of the tooth width ($T_1$) of the stator lamination to the bore circumference divided by the number of stator slots $S_1$, ($TS = \pi \times ID / S_1$). This effectively provides an indication of the tooth width. The value Bt1/By1 can be used to represent the flux density in the tooth to the flux density in the yoke if it is assumed that the flux in the tooth and yoke is the same, which is a close approximation. This ratio gives an indication of tooth to yoke ratio. This ratio is also determinable geometrically from a stator lamination by the relationship $Bt1/By1 = (\pi \times n \times Y1)/(S_1 \times T_1)$ where n is the number of poles, Y1 is the dimension shown in FIGS. 3 and 5, and $S_1$ and $T_1$ are as defined hereinabove.

The final column in FIG. 7 is a ratio of the interaction of the stator to the rotor, where S represents the number of slots, T represents the width of the tooth, 1 represents the stator and 2 represents the rotor. The chart of FIG. 7 sets forth the values and ranges for 2, 4 and 6 pole machines (n). For the 4 pole, 180 frame and 210 frame, two embodiments are shown.

For specific ratios see the table below identical to FIG.7 concept of the present invention which, as mentioned, is to utilize maximum amounts of lamination material and minimum amounts winding (i.e., copper) material.

Machines employing laminations configured according to the invention have yielded greater horsepower to volume ratios when compared with known corresponding machines. Of course, variations occur depending on efficiency. However, Tables 1, 2 and 3 below show a comparison of efficiency and volume measurements for 2, 4 and 6 pole AC induction motors with laminations according to the present invention and corresponding motors according to the prior art.

Through the use of relatively wider teeth in the present laminations, flux density satauration for a given size and power machine can be achieved with a shorter lamination stack than in the prior constructions. Hence, the electromagnetic volume $(OD)^2 L$ for machines according to the invention is generally lower than the

| ANSI NEMA FRAME | POLES | LAMINATION O.D. (TYP.)MM. STATOR | RO-TOR | ID/OD SPECIFIC | RANGE | TI/TS SPECIFIC | RANGE | FLUX DENSITY RATIO TOOTH YOKE PORTIONS $BT_1/BY_2$ SPECIFIC | RANGE | * $S2 \times T2/S1 \times T1$ SPECIFIC | RANGE |
|---|---|---|---|---|---|---|---|---|---|---|---|
| 180 | 2 | 203 | 95 | 0.468 | .45–.50 | 0.563 | .54–.59 | 1.234 | 1.17–1.25 | 0.85 | .83–.88 |
| 210 | 2 | 242 | 115 | 0.475 | .45–.50 | 0.548 | .52–.57 | 1.2 | 1.17–1.25 | 0.848 | .83–.88 |
| 180 | 4 | 203 | 122 | 0.601 | .58–.61 | 0.648 | .62–.68 | 1.204 | 1.17–1.25 | 0.919 | .86–.96 |
| 210 | 4 | 242 | 150 | 0.62 | .60–.62 | 0.611 | .60–.65 | 1.15 | 1.12–1.17 | 0.9 | .86–.96 |
| 180 | 4 | 203 | 122 | 0.601 | .58–.61 | 0.573 | .55–.60 | 1.173 | 1.14–1.20 | 0.9 | .86–.96 |
| 210 | 4 | 242 | 150 | 0.62 | .60–.62 | 0.516 | .50–.55 | 1.05 | 1.02–1.08 | 0.88 | .86–.96 |
| 180 | 6 | 203 | 122 | 0.601 | .58–.61 | 0.648 | .62–.68 | 1.806 | 1.76–1.84 | 0.84 | .80–.90 |
|  |  | 203 |  |  |  | 0.573 | .55–.60 | 1.76 | 1.72–1.80 | 0.95 | .92–.98 |

*
S2 (NUMBER OF ROTOR SLOTS)
S1 (NUMBER OF STATOR SLOTS)
T1 (STATOR TOOTH WIDTH)
T2 (ROTOR TOOTH WIDTH)

FIG. 8 is a table in which physical constants, relationships, and ratios associated with the laminations dimensioned according to the invention as shown in FIG. 7 are compared with the closest known prior configuration, for 2, 4 and 6 pole AC induction motors for a 180 frame size. For comparison with known values, the specific measurements have been converted into inches. Of course, the ranges still remain the same as was shown in FIG. 7. Included in this chart is a value of the net and gross area of the slots in the stator multiplied by the number of slots in the stator (S1). The net slot area (ASLOT-NET) equals the gross slot area (ASLOT-GROSS, see FIG. 3) less the area occupied by the slot liners, separators, and wedges and less the area A3 at the mouth not available for insertion of windings (see FIG. 4).

FIG. 9 is a table similar to that of FIG. 8, in which laminations configured according to the invention as shown in FIG. 7, are compared with the closest known prior laminations for two and four pole AC induction motors with a 210 frame size. Again specific values have been converted to inches.

It will be seen from FIGS. 8 and 9 that in addition to having a lower inner diameter to outer diameter ratio and a higher ratio of flux density between the tooth and yoke portions than in the prior corresponding laminations, the teeth width of the present laminations is generally greater. It should be remembered that the present improved laminations are the result of an interaction of the various values. Thus, not each and every one of the values is consistently changed for each embodiment. The result, however, is consonant with the underlying volumes in the prior machines for the same efficiency. The use of wider or fatter teeth also produces a relatively higher flux density in the air gap between stator and rotor lamination stacks in machines according to the invention. Thus, more torque is produced on the rotor for a given machine size.

Figure 10:
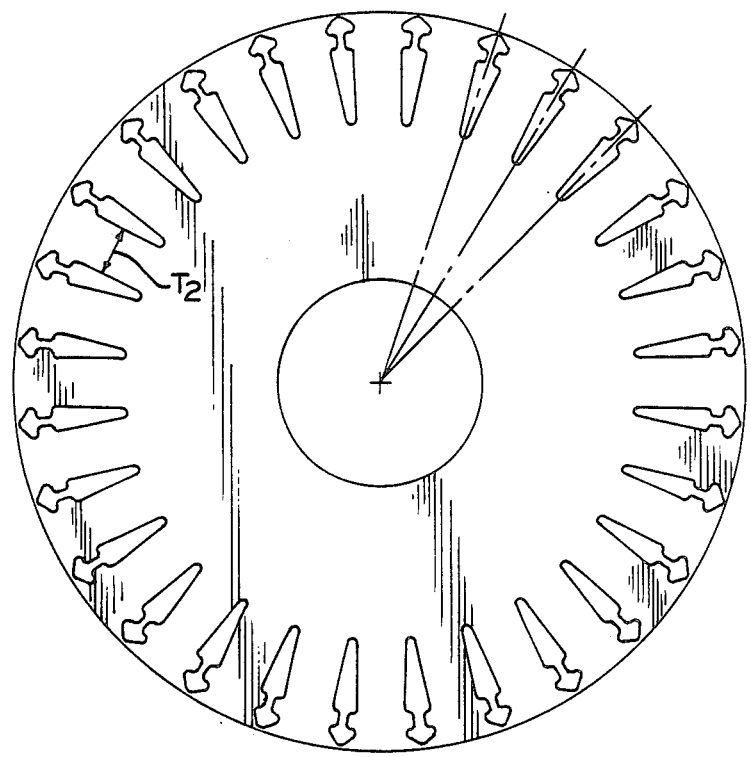
FIG. 10 is a plan view of a plate lamination for forming a slotted rotor.

FIG. 10 illustrates a rotor lamination, more fully described in co-pending application Ser. No. 020,299. FIG. 10 clearly illustrates the width T2 of the rotor teeth, and it will be understood that a fabricated rotor as shown in FIG. 1 would include a number S2 of rotor slots, and the same number S2 of rotor teeth each having a width T2 such that the various ratios involving S2 and T2, or the value of S2 in the tables of FIGS. 7, 8 and 9 are determinable in motors wherein principles of the present invention are applied.

TABLE 1

| | 2-POLE AC INDUCTION MOTORS | | | |
|---|---|---|---|---|
| | % EFFICIENCY | | VOLUME $(OD)^2 L$* | |
| HP | PRIOR | NEW | PRIOR | NEW |
| 5 (LO EFF) | 87.0 | 86.2 | 2.75 | 2.27 |
| 5 (HI EFF) | 89.8 | 91.2 | 3.67 | 4.74 |
| 7.5 (LO EFF) | 87.5 | 87.1 | 3.21 | 2.47 |
| 7.5 (HI EFF) | 90.6 | 91.1 | 4.12 | 3.30 |

TABLE 2

| | 4-POLE AC INDUCTION MOTORS | | | |
|---|---|---|---|---|
| | % EFFICIENCY | | VOLUME (OD)²L* | |
| HP | PRIOR | NEW | PRIOR | NEW |
| 3 (LO EFF) | 84.8 | 86.0–86.7 | 2.42 | 2.06–2.27 |
| 3 (HI EFF) | 89.9 | 90.6–90.9 | 3.21 | 3.09 |
| 5 (LO EFF) | 85.3 | 87.4–88.2 | 2.75 | 2.68–3.30 |
| 5 (HI EFF) | 90.6 | 90.8–91.5 | 4.37 | 3.30–3.92 |

TABLE 3

| | 6-POLE AC INDUCTION MOTORS | | | |
|---|---|---|---|---|
| | % EFFICIENCY | | VOLUME (OD)²L* | |
| HP | PRIOR | NEW | PRIOR | NEW |
| 2 (LO EFF) | 83.1 | 83.7 | 2.41 | 2.47 |
| 2 (HI EFF) | 88.7 | 89.8 | 4.35 | 3.71 |

*MM³ × 10⁶ Thus, tabular value of 2.75 means 2.75 (10⁶) MM³; tabular value 2.27 means 2.27 (10⁶) MM³; etc.

Terminology used herein includes the words "generally cylindrical", "essentially round" and "annular". When these terms are used herein with reference to or in connection with laminations (or plates) or structures made from such laminations (e.g., "cores", stators, etc.), such terms will be inclusively descriptive of laminations, cores, etc. that do not have "true round" configurations due to the presence of peripherally located "key slots", marker notches, flats resulting from production processes (such as occur from zig-zag punch lines, for example), and so forth.

RELATIONSHIP TO OTHER APPLICATIONS

This application is being filed on the same day as commonly assigned applications BASE ASSEMBLY FOR DYNAMO-ELECTRIC MACHINE in the name of Robert L. Sieber, Ser. No. 019,823; CLOSED SLOT ROTOR CONSTRUCTION in the names of Deepakkumar J. Gandhi et al., Ser. No. 020,299; -LIP STRUCTURE FOR A STATOR IN A DYNAMO-ELECTRIC MACHINE in the names of Deepakkumar J. Gandhi et al., Ser. No. 019,811.

While the concept of the invention has generally been described in connection with a stator lamination, it should be appreciated that the same concept of increasing the amount of ferromagnetic material as compared to the amount of copper, or conductive material, can also be applied to a rotor lamination. Similar concepts would be applied by making the teeth wider on the rotor and the slots smaller.

While the foregoing description represents preferred embodiments of the present invention, it will be obvious to those skilled in the art that various changes and modifications may be made, without departing from the true spirit and scope of the present invention.

What I claim is:

1. A lamination for use in a generally cylindrical stack in a dynamo-electric machine, comprising:
   a flat annular plate of ferromagnetic material having a given outer diameter and a generally circular bore opening of a certain inner diameter,
   said plate having a number of equally circumferentially spaced slot openings extending radially from an intermediate circumfrence of said plate to form a number of teeth which extend radially to an air gap periphery of said plate,
   wherein said slot openings are formed to contain electrically conducting elements which extend axially through the lamination stack when like ones of said plate are stacked face to face with corresponding slot openings substantially aligned with one another, said conducting elements being arranged to correspond to an n pole operating configuration, and magnetic flux is produced next to the inner peripheries of the stacked plates when electric current is passed through the conducting elements,
   said annular plate including a tooth portion defined by said teeth between said intermediate circumference and said inner periphery, and a yoke portion defined by a substantially continuous surface of said plate between said intermediate circumference and the outer periphery of said plate radially opposite said inner periphery, and
   wherein for a given ratio of said certain inner diameter to said given outer diameter for said plate, said teeth are sufficiently wide relative to the area of said slot openings so that the ratio of flux density in said tooth portion to flux density in said yoke portion in response to said electric current is optimized for a given n pole operating configuration,
   and
   wherein the ratio of inner diameter to outer diameter is in the range of about 0.45 to 0.50 for n equals 2, 0.58 to 0.62 for n equals 4 and 0.58 to 0.61 for n equals 6.

2. The lamination according to claim 1, wherein n is 2, said ratio of inner diameter to outer diameter is in the range of from about 0.45 to 0.50, and said ratio of flux density is in the range of about 1.17 to 1.25.

3. The lamination according to claim 2, wherein said ratio of inner diameter to outer diameter is about 0.468, and said ratio of flux density is about 1.234.

4. The lamination according to claim 2, wherein said ratio of inner diameter to outer diameter is about 0.475, and said ratio of flux density is about 1.20.

5. The lamination according to claim 1, wherein n is 4, said ratio of inner diameter to outer diameter is in the range of about 0.58 to about 0.61, and said ratio of flux density is in the range of from about 1.14 to about 1.25.

6. The lamination according to claim 5, wherein said ratio of said inner diameter to outer diameter is about 0.601 and said ratio of flux density is about 1.173 to about 1.204.

7. The lamination according to claim 1, wherein n is 4, said ratio of inner diameter to outer diameter is in the range of from about 0.60 to about 0.62, and said ratio of flux density is from about 1.02 to about 1.17.

8. The lamination according to claim 7, wherein said ratio of inner diameter to outer diameter is about 0.62 and said ratio of flux density is from about 1.05 to 1.15.

9. The lamination according to claim 1, wherein n is 6, said ratio of inner diameter to outer diameter is in the range of about 0.58 to about 0.61 and said ratio of flux density is in the range from about 1.72 to about 1.84.

10. The laminations according to claim 9, wherein said ratio of inner diameter to outer diameter is about 0.601 and said ratio of flux density is from about 1.76 to about 1.806.

11. The lamination according to claim 3, wherein said plate is a stator lamination with said bore opening defining said inner periphery, and the outer diameter of said plate is about 203 mm.

12. The lamination according to claim 4, wherein said plate is a stator lamination with said bore opening defining said inner periphery, and the outer diameter of said plate is about 242 mm.

13. The lamination according to claim 6, wherein said plate is a stator lamination with said bore opening defining said inner periphery and the outer diameter of said plate is about 203 mm.

14. The lamination according to claim 8, wherein said plate is a stator lamination with said bore opening defining said inner periphery, and the outer diameter of said plate is about 242 mm.

15. The lamination according to claim 10, wherein said plate is a stator lamination with said bore opening defining said inner periphery, and the outer diameter of said plate is about 203 mm.

16. A dynamo-electric machine, comprising:
a generally cylindrical casing;
a stator core fixed in said casing and comprised of plate laminations of ferromagnetic material, said stator core having a cylindrical bore;
a stator winding embedded in slots a certain radial depth from the circumference of said bore and which slots extend generally axially along the core, with end turns of said winding extending beyond end faces of said stator core;
a rotor supported in said bore for rotational movement, said rotor including conductive means for interacting with a magnetic field produced in an air gap between the outer periphery of said rotor and the inner periphery of the bore of said stator core when said stator winding is energized;
wherein each of said stator plate laminations comprises:
a flat annular plate of ferromagnetic material having a preselected outer diameter and a generaly circular inner opening of a preselected inner diameter which forms the stator bore when like ones of said plates are stacked face-to-face with one another,
said plate having a number of uniformly circumferentially spaced slots which extend radially outwardly from the bore to an intermediate circumference of said plate and which establish teeth therebetween, the distal ends of said teeth establish said bore, said slot openings forming said stator slots when corresponding slot openings in the like plates are aligned with one another and the plates are stacked,
said annular plate including a tooth portion defined by said teeth between said intermediate circumference and said bore, and a yoke portion defined between said intermediate circumference and the outer periphery of said plate, and
wherein for a given ratio of said preselected inner diameter to said preselected outer diameter for said plate, said teeth are sufficiently wide relative to the area of said slot openings so that the ratio of flux density in said tooth portion to flux density in said yoke portion in response to energization of the winding is optimized for a given n pole operating configuration of said stator winding, and wherein the ratio of inner diameter to outer diameter is in the range of about 0.45 to 0.50 for n equals 2, 0.58 to 0.62 for n equals 4 and 0.58 to 0.61 for n equals 6.

17. The dynamo-electric machine of claim 16, wherein said stator winding is comprised of a minimum number of conductors contained in the stator slots for said operating configuration, so that flux leakage from said end turns at the end faces of said stator is substantially reduced.

18. The dynamo-electric machine of claim 16, wherein n is 2, said ratio of inner diameter to outer diameter is in the range from about 0.45 to 0.50, and said ratio of flux density is in the range of from about 1.17 to 1.25.

19. The dynamo-electric machine of claim 18, wherein said ratio of inner diameter to outer diameter is about 0.47 and said ratio of flux density is about 1.23.

20. The dynamo-electric machine of claim 18, wherein said ratio of inner diameter to outer diameter is about 0.47 and said ratio of flux density is about 1.20.

21. The dynamo-electric machine of claim 16, wherein n is 4, said ratio of inner diameter to outer diameter is in the range from about 0.58 to 0.61, and said ratio of flux density is in the range of from about 1.14 to about 1.25.

22. The dynamo-electric machine of claim 21, wherein said ratio of inner diameter to outer diameter is about 0.601, and said ratio of flux density is from about 1.173 to about 1.204.

23. The dynamo-electric machine of claim 16, wherein n is 4, said ratio of inner diameter to outer diameter is in the range of from about 0.60 to about 0.62, and said ratio of flux density is from about 1.02 to about 1.17.

24. The dynamo-electric machine of claim 23, wherein said ratio of inner diameter to outer diameter is about 0.62, and said ratio of flux density is from about 1.05 to about 1.15.

25. The dynamo-electric machine of claim 16, wherein n is 6, said ratio of inner diameter to outer diameter is in the range of from about 0.58 to about 0.61, and said ratio of flux density is in the range of from about 1.72 to about 1.84.

26. The dynamo-electric machine of claim 25, wherein said ratio of inner diameter to outer diameter is about 0.601 and said ratio of flux density is from about 1.76 to about 1.806.

27. The dynamo-electric machine of claim 19, wherein the outer diameter of said plate is about 203 mm.

28. The dynamo-electric machine of claim 20, wherein the outer diameter of said plate is about 242 mm.

29. The dynamo-electric machine of claim 22, wherein the outer diameter of said plate is about 203 mm.

30. The dynamo-electric machine of claim 24, wherein the outer diameter of said plate is about 242 mm.

31. The dynamo-electric machine of claim 26, wherein the outer diameter of said plate is about 203 mm.

32. A dynamo-electric machine comprising a rotor made from laminations have a preselected number of teeth of predetermined tooth widths, and a stator core made of stator laminations wherein the stator is wound for n pole operation during energization thereof, and wherein each stator lamination comprises:
a flat annular plate of ferromagnetic material having a given outer diameter and a generally circular bore opening of a certain inner diameter,
each plate having a number of uniformly circumferentially spaced slot openings extending radially from an intermediate circumference of said plate to form a number of teeth which extend radially to an air gap periphery of said plate, wherein said slot openings are formed to contain electrically conducting elements which extend axially through the lamination stack when like ones of the plates are stacked face-to-face with corresponding slot openings in communication with one another, said conducting elements being arranged to correspond to an n pole operating configuration, and magnetic flux is produced around the conducting elements when electric current is passed through the conducting elements, said annular plate including a tooth portion defined by said teeth between said intermediate circumference and said inner periphery, and a yoke portion defined by a substantially continuous surface of said plate between said intermediate circumference and the outer periphery of said plate radially opposite said inner periphery, and wherein the product of the number of rotor slots times the rotor tooth width is a first value, the product of the number of stator slots times the width of the stator teeth is a second value, and the ratio of the first value to the second value is in the range of 0.83 to 0.88 when n is 2 and greater than 0.82 when n is 6.

33. The invention of claim 2 wherein the ratio of the first value to the second value is in the range of 0.845 to 0.850 inclusive.

34. A dynamo-electric machine comprising a rotor made from laminations have a preselected number of teeth of predetermined tooth widths, and a stator core made of stator laminations wherein the stator is wound for n pole operation during energization thereof, and wherein each stator lamination comprises:

a flat annular essentially full round plate of ferromagnetic material having an outer diameter of about 203 mm. and a generally circular bore opening of a preselected inner diameter.

each plate having a number of uniformly circumferentially spaced slot openings extending radially from an intermediate circumference of said plate to form a number of teeth which extend radially to an air gap periphery of said plate, wherein said slot openings are formed to contain electrically conducting elements which extend axially through the lamination stack when like ones of the plates are stacked face-to-face with corresponding slot openings in communication with one another, said conducting elements being arranged to correspond to an n pole operating configuration, and magnetic flux is produced around the conducting elements when electric current is passed through the conducting elements, said annular plate including a tooth portion defined by said teeth between said intermediate circumference and said inner periphery, and a yoke portion defined by a substantially continuous surface of said plate between said intermediate circumference and the outer periphery of said plate radially opposite said inner periphery, and wherein n is preselected to be less than 6, the ratio of flux density in said tooth portion to flux density in said yoke portion is greater than 1.17, the product of the number of rotor slots times the rotor tooth width is a first value, the product of the number of stator slots times the width of the stator teeth is a second value, and the ratio of the first value to the second value is in the range of 0.83 to 0.93

* * * * *